United States Patent

Inoue et al.

[15] 3,644,734

[45] Feb. 22, 1972

[54] THIN LAYER CHROMATOGRAPHIC ANALYSIS UTILIZING MIXTURES OF FLUORESCENT SUBSTANCES AND ULTRAVIOLET RADIATION

[72] Inventors: Masao Inoue, Kawasaki; Zenzo Tamura, Tokyo, both of Japan

[73] Assignee: Tokyo Shibaura Electric Co., Ltd., Kawasaki-shi, Japan

[22] Filed: Mar. 6, 1970

[21] Appl. No.: 17,155

Related U.S. Application Data

[62] Division of Ser. No. 755,984, Aug. 28, 1968.

[52] U.S. Cl. ........................250/71 R, 210/31 C, 210/198 C, 250/71.5 R, 250/83.3 UV, 252/301.2 R, 356/51
[51] Int. Cl. ........................................................G01n 21/22
[58] Field of Search ...................250/71 R, 71.5 R, 83.3 UV; 210/198 C, 31 C; 356/51; 252/301.2 R

[56] References Cited

UNITED STATES PATENTS

| 3,352,221 | 11/1967 | Barron et al. | 250/71 X |
| 3,303,043 | 2/1967 | Halpaap et al. | 250/71 T UX |

*Primary Examiner*—James W. Lawrence
*Assistant Examiner*—Morton J. Frome
*Attorney*—Kemon, Palmer & Estabrook

[57] ABSTRACT

A method of qualitative analysis of sampled materials by thin layer chromatography or paper chromatography using an adsorbent mingled with a mixture of two or more kinds of fluorescent substances, which exhibit different excitation and emission spectra from each other, and applying an ultraviolet radiation to said adsorbent.

8 Claims, 5 Drawing Figures

THIN LAYER CHROMATOGRAPHIC ANALYSIS UTILIZING MIXTURES OF FLUORESCENT SUBSTANCES AND ULTRAVIOLET RADIATION

CROSS-REFERENCE TO RELATED APPLICATION

This application is a divisional application of our copending application Ser. No. 755,984, filed Aug. 28, 1968.

BACKGROUND OF THE INVENTION

This invention relates to a fundamental method for detecting wave lengths of ultraviolet rays, and more particularly to a method of qualitative analysis by ultraviolet radiations having known wavelengths.

The usually practiced methods for detecting ultraviolet radiations include the following:

1. A method which consists in allowing monochromatic ultraviolet radiations separated by a prism or grating-type spectroscope to be received in a suitable photoelectric detector such as a photoelectric multiplier or photoelectric tube to find the spectroenergy distribution of the ultraviolet radiations applied.
2. A method selectively using different types of illuminometers for germicidal radiations, erythemal radiations for health and near ultraviolet radiations each provided with a photoelectric tube, wherein the peaks of spectral sensitivity appear at the wavelengths of 250 $m\mu$, 290 $m\mu$ and 360 $m\mu$ respectively.
3. A method using various combinations of filters and photoelectric detectors among those listed above.

The method (1) is widely used, because it is most adapted for quantitative determination. However, an apparatus associated with this method is considerably expensive, involves complicated operations and requires much time in completing determination, so that the method is unsuitable for quick and handy qualitative detection. An apparatus used for the method (2) makes the same response to ultraviolet radiations though they have a fairly broad range of wavelengths, so that when a monochromatic ultraviolet radiation is irradiated it is difficult to define the particular wave length thereof. The method (3) requires an apparatus which is most costly next to that of the method (1), involves complicated operations and consumes as long time in determination as in (1).

SUMMARY OF THE INVENTION

An object of the present invention is to provide an improved method which does not require an expensive apparatus but permits an easy and quick qualitative determination of ultraviolet radiations of unknown wavelengths.

Another object of the invention is to irradiate continuous ultraviolet radiations on a sample of unknown material, determine the absorption or emission of radiation from the presented visible colors and use the results of such determination as an aid in finding the kind of material constituting said sample.

The above objects of the present invention may be attained by using a mixture of two or more kinds of specific fluorescent substances which present different excitation and emission spectra, irradiating ultraviolet radiations having unknown wavelengths to the fluorescent mixture and identifying the distinctive visible colors presented thereby to detect the wavelengths of the rays in comparison with the known standard colors presented by the mixed substances irradiated by ultraviolet radiations having known wavelength.

The features of the invention which are believed to be novel are set forth with particularly in the appended claims. The invention itself, however, as to its organization together with further objects and advantages thereof, may best be understood by reference to the following description taken in connection with the accompanying drawings.

DETAILED DESCRIPTION OF THE INVENTION

Figure 1:
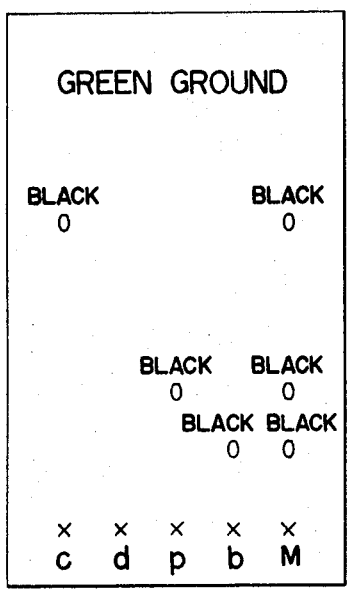
FIG. 1 shows an example of a thin layer chromatographic analysis using an adsorbent mixed with a single fluorescent substance.

It is for the following reason that the present invention uses a mixture of fluorescent substances which present different excitation and emission spectra.

If a single fluorescent substance is irradiated with ultraviolet (hereinafter referred to as "UV") radiations, the colors of luminescent spots produced do not always correspond to the different wave lengths of the UV radiations applied. However, even in the use of mixed two or more fluorescent substances, for example, a combination of calcium halophosphate activated by antimony and calcium halophosphate activated by antimony and manganese which have substantially the same excitation spectrum, but different emission spectrum, or a combination of magnesium fluorogermanate activated by manganese and magnesium arsenate activated by manganese which have different excitation spectrum from each other, but substantially the same emission spectrum, or a combination of magnesium arsenate activated by manganese and magnesium boroarsenate activated by manganese which have substantially the same excitation and emission spectra, the colors of luminescent spots obtained do not necessarily accord with the different wavelengths of the UV radiations applied as in the case where only one fluorescent substance is irradiated.

We have found that it is only when a mixture of two or more fluorescent substances which display different patterns in both excitation and emission spectra is subjected to UV radiations that the colors of luminescent spots produced distinctly agree with the different wavelengths of said radiations.

According to the present invention, mixed powders of two or more fluorescent substances as specified above are pulverized to the extent that their average grain size is reduced to 3 to 10 microns as measured by the Blaine method, using a mixer, for example, a ball mill. After formed into any thin layer, the mixed fluorescent substances are placed in the irradiating zone of a UV radiation detecting apparatus to observe the colors of the luminescent spots produced by the irradiation. Since the colors of the luminescent spots exhibited by each combination of the above-mentioned fluorescent substances when exposed to UV radiation of a known wavelength have already been defined, it is possible to discriminate the colors of luminescent spots exhibited by the mixed fluorescent substances when irradiated with UV radiations of unknown wavelengths, thus permitting an easy qualitative determination of the wavelength which constitutes the main component of the wavelengths of the UV radiation applied.

While the method of the present invention enables a number of wave lengths involved in polychromatic UV radiations to be determined at the same time, it is particularly adapted to distinguish wavelength of a monochromatic UV radiation qualitatively and distinctly.

The aforementioned mixture of fluorescent substances may be replaced by a laminate formed by securely superposing a thin layer of each fluorescent material on a glass plate. However, it is desired that the fluorescent substances be so combined as not only to meet the specified conditions as described above, but also to assure that the spectrum exhibits a sharp pattern of distribution and distinct alienation.

Where the fundamental method of the present invention is utilized in various physicochemical analytical processes the qualitative determination may be carried out with continuous UV radiations. When the mixture of fluorescent substances of the present invention is directly irradiated with continuous UV radiations the presented visible color obtained presents a white shade due to intermingling of many different wavelengths. However when the continuous UV radiation is allowed to permeate through a sample of analysis or to be irradiated thereon the particular wavelength or lengths of the UV radiation are absorbed by the sample. And when the remaining UV rays or a composite UV radiation formed by addition of the UV rays of particular wavelength emitted by the sample is irradiated on the mixed fluorescent substances of the present invention, then specific visible colors appear thereon according to absorption or emission. Observation of such colors permits an easy qualitative determination of the unknown material of the sample.

EXAMPLES

The invention is more clearly set forth in the following examples and applied embodiments.

Table 1 presents several combinations of mixed fluorescent substances, the blending ratio of each such substance, and the kinds of monochromatic colors corresponding to the different wavelengths of the UV radiations applied. The fluorescent substances in this table were respectively prepared by the following processes.

$Sr_{1.97}P_2O_7/Sn_{0.032}$—:30.0 kg. of strontium pyrophosphate $Sr_2P_2O$ and 0.54 kg. of tin hydrogenphosphate $SnHPO_4$ were mixed and milled 1.5 hours in a 150 $l$ ball mill. The mixture was put in a quartz tray 25cm.×18cm.×9cm. in size, heated at 1,000° C. for 1 hour in the air another hour at the same temperature in an atmosphere of a forming gas consisting of 5 percent H and 95 percent $N_2$ which was introduced at a flow rate of 1,000 $l$ per hour. After cooling, the mixture was again pulverized in the ball mill to obtain a fluorescent substance. The composition of the product computed from the proportions of the raw materials accorded with the aforementioned chemical formula.

$Zn_{1.75}SiO_4/Mn_{0.1}$ A 3.37 kg. of silica $SiO_2$, 8.00 kg. of zinc oxide ZnO and 0.63 kg. of manganese carbonate $MnCO_3$ were mixed and milled for 1 hour in a 50 $l$ ball mill. The mixture was put in a quartz tray 25cm.×18cm.×9cm. in size, and heated 3 hours at 1,200° C. in the air with the tray closed. After cooling, the mixture was again pulverized in the ball mill to obtain a fluorescent substance. Its composition was exactly as shown by the above-mentioned chemical formula.

$Y_{0.88}VO_4/Eu_{0.045}$—:27 kg. of yttrium oxide $Y_2O_3$, 25 kg. of vanadium oxide $V_2O_5$, 2.2 kg. of europium oxide $Eu_2O_3$ and 1 kg. of sodium carbonate $Na_2CO_3$ were mixed and milled 3 hours in a 400 $l$ ball mill. The mixture was put in a 280 cc. quartz crucible and heated 2 hours at 1,200° C. in the air. After cooling, the mixture was again pulverized in a ball mill, followed by water washing, filtering and drying, to obtain a fluorescent substance. Its composition agreed with the aforementioned chemical formula. $ZnS/Ag_{0.00014}$—:100 kg. of zinc sulfide ZnS, 0.023 kg. of silver nitrate $AgNO_3$, 2 kg. of sodium chloride NaCl and 1.5 kg. of magnesium chloride $MgCl_2 \cdot 5H_2O$ were mixed in a 400 $l$ vessel with addition of 200 $l$ of water. After drying at 150° C., the mixture was put in a 280 cc. quartz pot fitted with a cap. After heating for 1 hour 900° C. and cooling, the mass was washed with water to remove the flux, and dried again to obtain a fluorescent substance. Its chemical composition was substantially as indicated by the aforementioned chemical formula.

$Zn_{0.6}Cd_{0.4}S/Ag_{0.0001}$—:50 kg. of zinc sulfide ZnS, 50 kg. of cadmium sulfide CdS, 0.0157 kg. of silver nitrate $NgNO_3$, 2 kg. of lithium chloride LiCl and 1 kg. of sodium chloride NaCl were mixed in a 400 $l$ vessel with addition of 200 $l$ of water. After drying at 150° C., the mixture was put in 280 cc. alumina pot fitted with a cap, and heated for 1 hour at 900° C. in the air. After cooling, the mass was washed with water to remove the flux, and then dried to obtain a fluorescent substance. Its composition was the same as the above-mentioned chemical formula.

When UV radiations having wavelengths varying from 200 to 380 m$\mu$ were irradiated on each of the groups A, B, C and D of thin layers of mixed fluorescent substances fixed on a glass plate, there were presented monochromatic colors corresponding to the respective wavelengths as category-two in Table 1. When UV radiations of unknown wavelengths were applied to an appropriate one among the aforesaid groups, their wavelengths were qualitatively determined conversely from the colors exhibited in the chromatic spectra thereof.

TABLE 1

Corresponding luminescent spectra to an ultraviolet radiation

| | Weight ratio of mixed fluorescent substrances |
|---|---|
| A | $Sr_{1.97}P_2O_7/Sn_{0.032}$ + $Zn_{1.75}SiO_4/Mn_{0.1}$ + $Y_{0.88}VO_4/Eu_{0.045}$<br>20 : 5 : 1 |
| B | $Zn_{1.75}SiO_4/Mn_{0.1}$ + $Y_{0.88}VO_4/Eu_{0.045}$ + $ZnS/Ag_{0.00014}$<br>5 : 1 : 2 |
| C | $Y_{0.88}VO_4/Eu_{0.045}$ + $Zn_{0.6}Cd_{0.4}S/Ag_{0.0001}$<br>1 : 1 |
| D | $Zn_{1.75}SiO_4/Mn_{0.1}$ + $Y_{0.88}VO_4/Eu_{0.045}$<br>9 : 1 |

| | Wave lengths of irradiated UV radiation<br>200m$\mu$ ———————————————— 380m$\mu$<br>Corresponding chromatic colors |
|---|---|
| A | blue → green → yellow → orange → red → pale green |
| B | green → red → violet → blue |
| C | reddish orange → yellow → green |
| D | green → yellow → red → pale green |

APPLIED EMBODIMENTS

1. Application to the thin layer chromatography

The UV radiation detecting material used in the thin layer chromatography was prepared by mixing an adsorbent, e.g., silica gel or alumina, a mixture of fluorescent substances of the present invention corresponding to 20 weight percent of the adsorbent, and small amounts of adhesive material, and suspending 10 g. of the mixture in 10 ml. of water. The suspension was coated on the surface of a plate of glass or transparent polyvinyl chloride, followed by drying, to form a thin layer of UV radiation detecting material for chromatography.

At the base point on the thin layer coated plate was deposited about 5 $\mu l$ of a sample solution whose UV spectrum was expected to display a maximum adsorption or emission. On this deposit was further poured a suitable solvent. When a continuous UV radiation was allowed to be irradiated on the surface or permeated therethrough, various visible colors were observed by the naked eye at different luminescent spots. Though the positions of the spots on the thin layer coated plate are omitted, Table 2 shows the colors of luminescent spots produced according to the kinds of samples tested, where the groups A, C and D of mixed fluorescent substances of Table 1 were separately used.

If a standard identification table such as Table 2 is prepared in advance with respect to a large number of known materials (there should also be indicated the position of each luminescent spot) the same chromatographic process as described above will enable the unknown materials of tested samples to be identified qualitatively with ease by observing with the naked eye the colors and positions of the luminescent spots produced by irradiating a continuous UV radiation thereon.

TABLE 2

The colors of luminescent spots on the chromatographic column or plate using various materials and fluorescent substances

| Materials | Fluorescent substance in Table 1 | | |
|---|---|---|---|
| | A | C | D |
| 2-4-dinitrophenyl alanine | green | brown | green |
| Methylamine azobenzene | green | brown | green |
| Acetaldehyde-2-4-dinitrophenyl hydrazone | green | brown | green |
| Anthraquinon | violet | green | violet |
| Sulfathiazole | reddish violet | green | violet |
| Pyridoxal | blue | blue | blue |
| Caffeine | reddish violet | green | violet |
| Sulfanil amide | reddish violet | green | violet |

With regard to a chemical substance having a mole absorbancy index of about 20,000, the presence of it can be discriminated using only an extremely small amount of 1 μg. thereof.

The same procedure as mentioned above is also applicable to the column chromatography.

The aforesaid thin layer coated plate may be replaced by another means which consists in dripping about 5 cc. of sample solution on the base point of a UV rays permeable glass plate coated with only a thin layer of an adsorbent, followed by superposing this glass plate on a detecting plate of another ordinary glass or polyvinyl chloride coated with any of the mixed fluorescent substances of the present invention so as to cause the uncoated plane of both plates to be positioned outside, and thereafter irradiating continuous UV radiation on the surface of the UV rays permeable glass.

This alternative means can also carry out the thin layer chromatography as effective as the preceding process.

There will now be described the embodied example of the thin layer chromatography.

Ten parts of the group A of the mixed fluorescent substances in Table 1 were mixed with 90 parts of silica gel. 10 cc. of 1 percent starch solution were added to 10 g. of the mixture to prepare a suspension.

A transparent 10cm.×20cm. glass plate was securely held in place at an angle of 60° to horizontal plane. On this glass plate was poured the aforesaid suspension to form a thin layer, which was then heated to 100° C. to prepare a chromatographic thin layer coated plate.

The samples used consisted of a mixture comprising 10 mg. of caffeine, 10 mg. of dibucaine, 20 mg. of procaine and 10 mg. of brucine, and were dissolved in 1 cc. of methanol. Differently from this, each of these materials was simply dissolved respectively in 1 cc. of methanol. 1 cc. of each solution was dripped on a point, which was 4 cm. distant from the bottom end of the plate coated with the thin layer.

Each sample-carrying plate was allowed to stand 30 minutes in a gaseous atmosphere of developing bath containing a developer (for instance, methanol). Thereafter each plate was again dipped to 1 cm. distance from the bottom end thereof for 30 minutes in the liquid phase of the developer by positioning the plate at an angle of 60° to horizontal plane. After removal from the bath, each plate was allowed to dry naturally in a dark place.

The dripped sample solutions were gathered in different spots at various heights on the thin layer coated plate due to their different partition coefficients relative to the adsorbent. While these spots could not be recognized by the naked eye, a UV radiation having continuous wavelengths irradiated on the thin layer of fluorescent mixture on the plate causes a specific color to be presented on the thin layer as a visible spot respectively to the naked eye.

Figure 2:
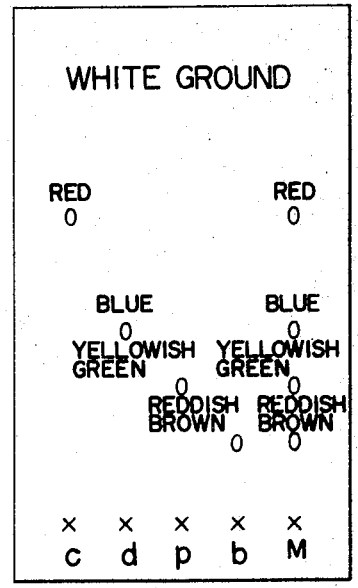
FIG. 2 shows an example of the thin layer chromatographic analysis using an adsorbent comprising a mixture of fluorescent substances of the present invention.

FIGS. 1 and 2 show visible spots produced when a continuous UV radiation was allowed to permeate through a plate coated with a thin layer of the aforementioned single and mixed fluorescent substances respectively. Throughout the figures, the letter $c$ represents caffeine, the letter $d$ dibucaine, the letter $p$ procaine, the letter $b$ brucine and the letter M a mixture of the materials denoted by the letter of $c$, $d$, $p$ and $b$. The marks $x$ indicated near the bottom of the figures designate the points at which each of the sample solutions was dripped.

In FIG. 1 there was used a single fluorescent substance $Sn_{1.75}SiO_4/Mn_{0.1}$. In this case, the entire thin layer presented a pale green color. In this ground there were observed a number of dark ashy spots at the positions shown in the figure, and the spot associated with dibucaine was indistinct and substantially undiscernible. In FIG. 2 there was used a mixture of fluorescent substances, namely, the group A of Table 1. In this case there were obtained spots of bright colors at the indicated positions, and the presence of dibucaine was also distinctly observed. Therefore the chromatographic process using the present invention makes it possible easily to identify the unknown material of a given sample tested conversely from the color and position of the luminescent spot produced.

2. Application to the paper chromatography

The mixed fluorescent substances listed in Table 1 were separately dispersed in acetone. To prepare a fluorescent plate, the dispersion was coated on a transparent glass plate 10cm.×20cm., followed by drying.

On the other hand, one composite vitamin tablet containing 5 mg. of vitamin $B_1$, 2.5 mg. of vitamin $B_6$, 70 mg. of vitamin C and 25 mg. of nicotinamide was extracted with 1 ml. of methanol. 1 μl of the extract was dripped at a point 6 cm. from the bottom of a chromatographic paper filter 10cm.×20cm. in size. The paper was allowed to stand 30 minutes in the gaseous phase of a developing bath, and then dipped 10 hours to 1 cm. from the bottom in the supernatant liquid of a developing bath consisting of 4 parts of n-butanol, 1 part of acetic acid and 5 parts of water. After removal from the bath, the paper was allowed to dry naturally in the dark for development.

Figure 3:
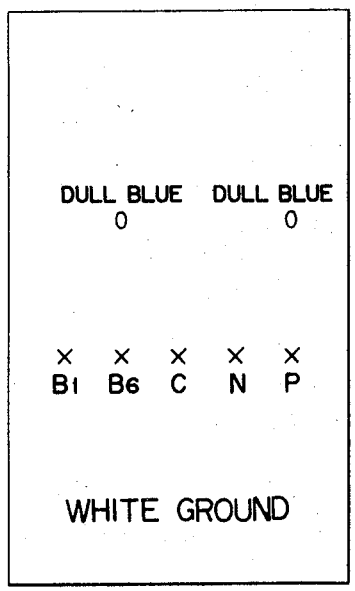
FIG. 3 shows an example of a paper chromatographic analysis using no fluorescent substance.
Figure 4:
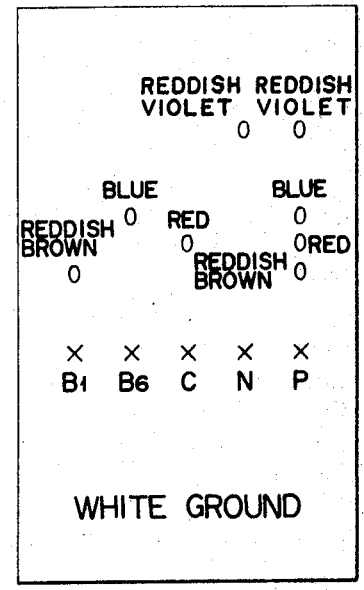
FIG. 4 shows an example of the paper chromatographic analysis using a detecting plate coated with a mixture of fluorescent substances of the present invention.

The developed paper was superposed on the plate coated with the fluorescent substances of the present invention and a continuous UV radiation was allowed to permeate the paper from the side. Then as shown in FIG. 4 there distinctly appeared spots of different colors at various positions on the paper according to the materials of the samples used. By way of comparison, the same continuous UV radiation was allowed to permeate the developed paper without using a plate coated with such fluorescent materials. Then as shown in FIG. 3, only vitamin $B_6$ displayed an indistinct dull blue spot, whereas there appeared no spots to indicate the presence of the other ingredients of the vitamin tablet.

3. Application to a photoelectric detecting camera for improved chromatography

In the aforementioned chromatographic determination using the present invention, it is sometimes impossible depending on the type of apparatus used or for operating convenience to take out of the apparatus a plate of paper on which a sample solution has been developed. In such case a detecting glass plate coated with any of the mixed fluorescent substances of the present invention cannot be superposed on said plate or paper. Thus it is necessary to irradiate continuous UV radiation on the plate or paper from the outside of the apparatus and receive permeated or reflected UV rays on the detecting glass plate positioned outside of the apparatus so as to identify the sample material.

Figure 5:
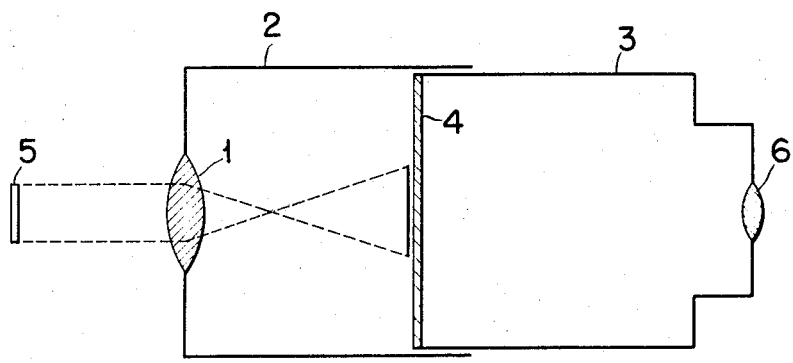
FIG. 5 is a schematic view of a photoelectric detecting camera used for chromatography in accordance with the present invention.

To this end, there has been devised by the present inventors a photoelectric detecting camera whose structure is schematically shown in FIG. 5. An inner box 3 is allowed to slide into an outer box 2 having a quartz lens 1 provided in the center of the front side thereof which is capable of collecting UV-radiation rays and permitting their passage. On the front side of the inner box 3 is disposed a glass plate 4, whose outside is coated with any of the mixed fluorescent substances of the present invention. When the real image of a subject 5 of determination, namely, a part of the developed chromatographic plate or paper, which has been formed by the UV rays transmitted therethrough or reflected therefrom, is concentrated on the detecting glass plate 4, then there appear on said detecting glass plate colored spots as described above. Lights from these spots are further magnified by a magnifying lens 6 positioned at the rear part of the inner box 3 to permit easy observation by the naked eye. If a filter (not shown) for obstructing daylight is provided in front of the quartz lens 1, the naked eye observation will be possible even in the daytime.

What we claim is:

1. In a method of thin layer chromatography wherein a material sample to undergo qualitative analysis is contacted with an adsorbent surface capable of separating components of the sample by their different partition coefficients relative to the adsorbent and the positions of the separated components upon the adsorbent surface are determined, the steps which comprise:
   a. providing a preformed chromatographic adsorbent surface member comprising a thin layer of an adsorbent having uniformly distributed throughout said layer a mixture of a plurality of fluorescent substances which exhibit different excitation and emission spectra from each other,
   b. preforming a chromatographic separation of a material sample with said chromatographic adsorbent surface member, and
   c. applying ultraviolet radiations to the thin layer of said member resulting from step "b."

2. A method according to claim 1 wherein said member is a detecting plate coated with a thin layer of silica gel in which said mixture of fluorescent substances is distributed.

3. A method according to claim 1 wherein said member is a detecting plate coated with a thin layer of alumina in which said mixture of fluorescent substances is distributed.

4. A method according to claim 1 wherein said member comprises a plate uniformly coated with said mixture of fluorescent substance and chromatographic adsorbent material.

5. In a method of thin layer chromatographic analysis wherein a material sample is separated into components upon a chromatographic adsorbent surface member and the presence of separated sample components upon said member is determined by ultraviolet radiation of said member, the improvement which comprises using a chromatographic adsorbent surface member that has been prepared prior to the chromatographic analysis to uniformly distributed throughout the adsorbent surface of said member a mixture of a plurality of fluorescent substances which exhibit different excitation and emission spectra from each other.

6. In a method of thin layer chromatographic analysis wherein a material sample is separated into components upon a chromatographic adsorbent surface member and the presence of separated sample components upon an extended surface area of said member is determined by ultraviolet radiation of said member, the improvement which comprises associating with said extended surface area at least during said ultraviolet radiation a uniform thin layer distribution of a mixture of a plurality of fluorescent substances which exhibit different excitation and emission spectra from each other.

7. A method according to claim 5, wherein said member is a detecting plate coated with a layer of chromatographic adsorbent material and said fluorescent substance mixture is associated with said extended surface area thereof by being mixed with the adsorbent material prior to coating of said plate.

8. A method according to claim 5 wherein said member is a sheet of chromatographic paper and said fluorescent substance mixture is associated with said extended surface thereof by superposing said paper sheet on a transparent plate coated uniformly with a thin layer of said mixture.

* * * * *